UNITED STATES PATENT OFFICE.

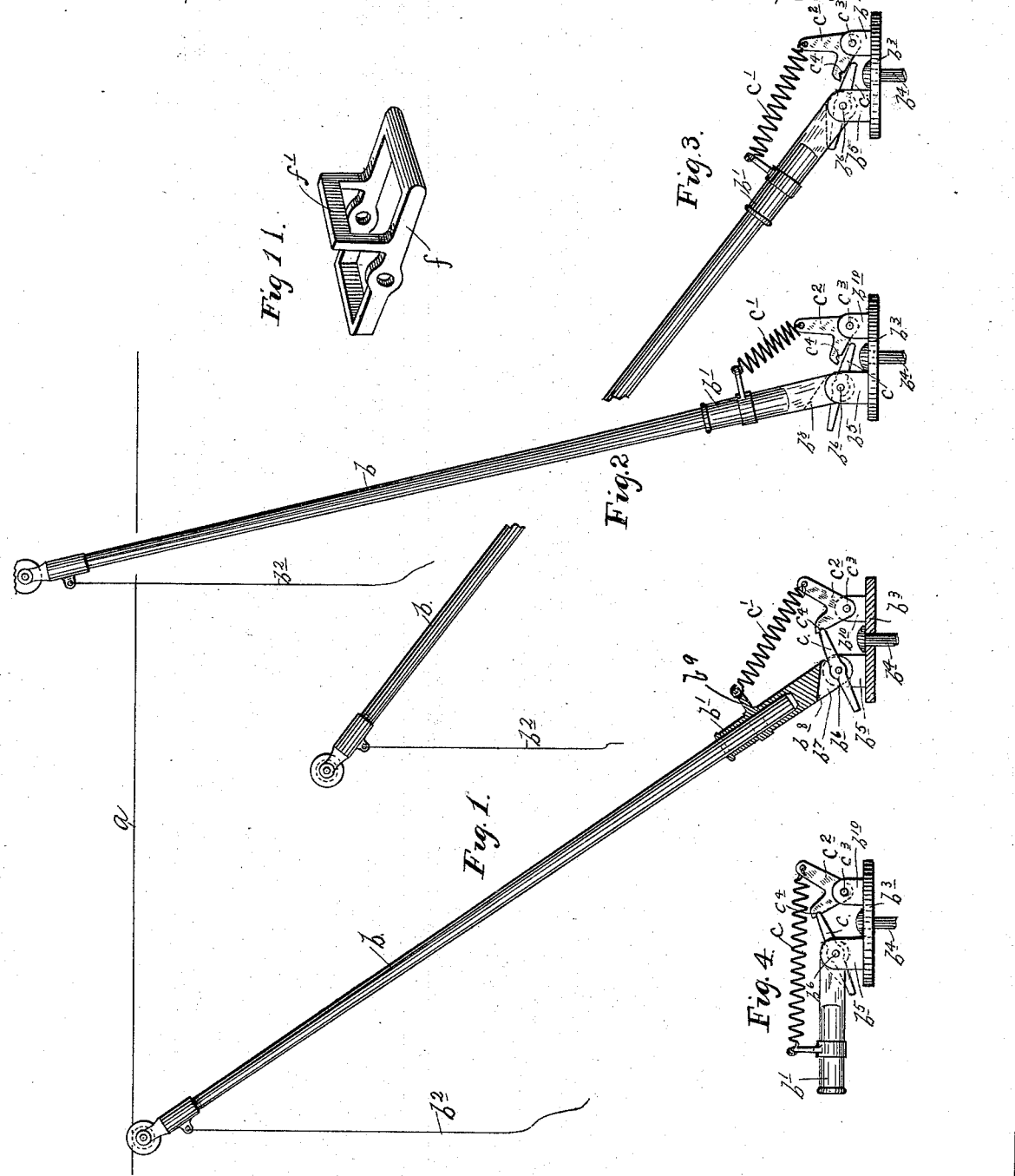

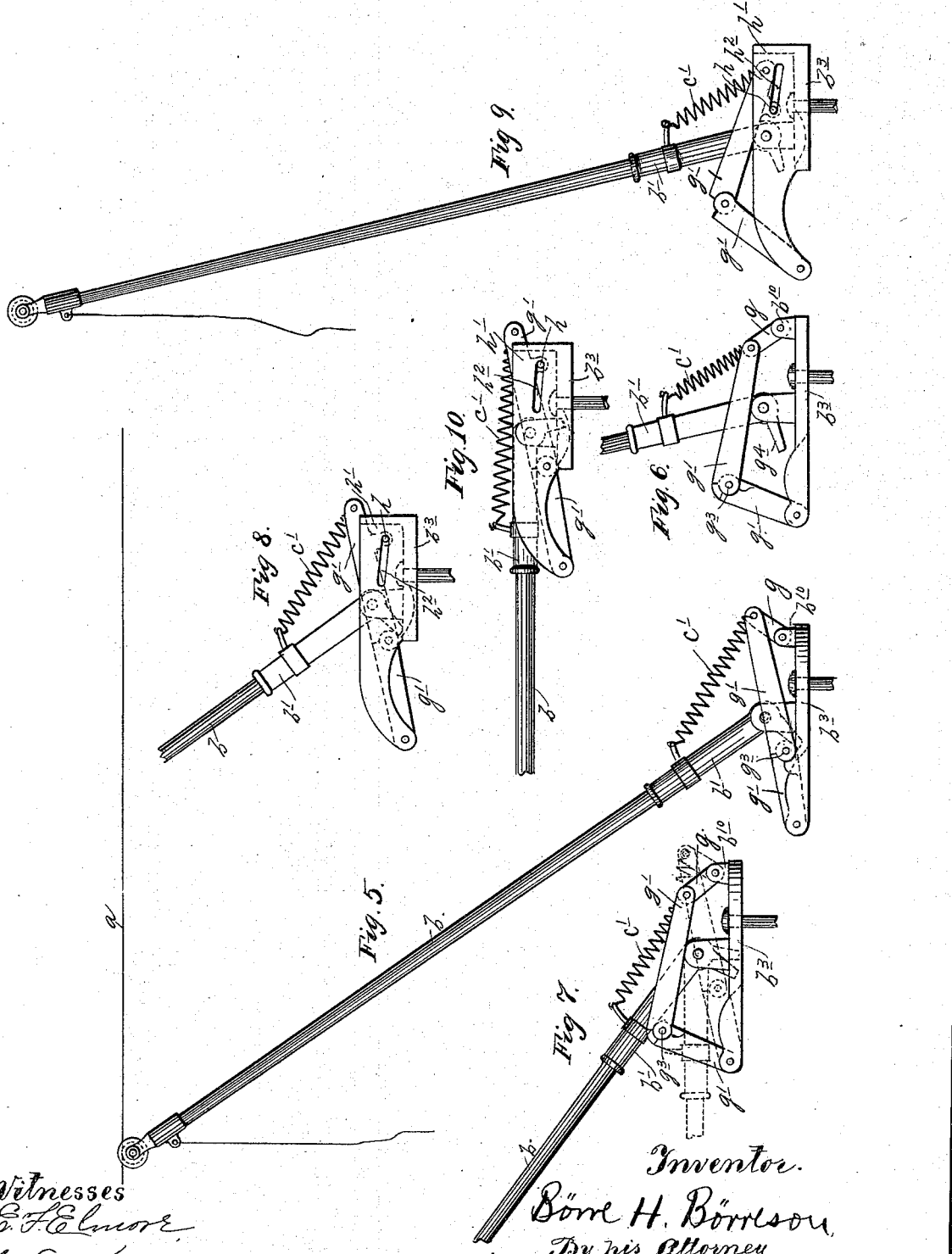

BÖRRE H. BÖRRESON, OF MINNEAPOLIS, MINNESOTA, ASSIGNOR OF ONE-HALF TO BERTHA A. JACKSON, OF SAME PLACE.

TROLLEY-POLE SAFETY DEVICE.

SPECIFICATION forming part of Letters Patent No. 573,257, dated December 15, 1896.

Application filed July 26, 1895. Serial No. 557,205. (No model.)

*To all whom it may concern:*

Be it known that I, BÖRRE H. BÖRRESON, a citizen of the United States, residing at Minneapolis, in the county of Hennepin and State of Minnesota, have invented certain new and useful Improvements in Trolley-Pole Safety Devices; and I do hereby declare the following to be a full, clear, and exact description of the invention, such as will enable others skilled in the art to which it appertains to make and use the same.

My invention relates to trolley-poles for electric street-railway cars, and has for its object to provide an improvement which will prevent breakage of the trolley-pole on account of interference from overhead objects, such as the arms of the line-supporting poles, bridges, tunnels, &c. With the ordinary trolley-pole now in general use, when the trolley jumps from the line-wire its upper end will remain projecting above the wire until pulled down by the conductor, and during this interval the pole is liable to meet an overhead obstruction which will cause breakage.

By my invention I provide a construction whereby when the pole jumps from the wire it will be instantly relieved from tension and will fall by gravity into a safe position below the level of the line-wire, and whereby when the pole is pulled down to or near to its lowermost limit the tension device will be reset under the proper working tension.

My mechanism for the purpose had in view may take many different forms, but all involve the common feature of a controller for the tension device which is operated by the upward movement of the pole, after the jump from the wire, to relieve the pole from tension, so as to cause the fall, and which is also operative by the pole, when pulled down near to its lowermost limit, to reset the pole tension device under the proper working tension.

In the accompanying drawings I have shown several different forms of my invention, wherein, like letters referring to like parts—

Figure 1 is a view, partly in elevation and partly in vertical section, showing my preferred construction in working position. Fig. 2 is an elevation of the same, showing the said parts in their tripped position as they would appear immediately after the trolley has jumped the wire. Fig. 3 is a view similar to Fig. 2, showing the same parts after the pole has fallen into its safe position. Fig. 4 is a similar view showing the same parts, with the exception that the pole is removed, as they appear when the pole is pulled down to reset the tension device under working tension. Figs. 5, 6, and 7 are corresponding views in elevation showing a modification. Figs. 8, 9, and 10 are corresponding views showing another modification; and Fig. 11 is a detail in perspective showing a modified form of a setting and tripping lever which may be substituted for the form shown in Figs. 1 to 4, inclusive.

Referring first to the construction shown in Figs. 1, 2, 3, 4, and 11, $a$ represents the line-wire. $b$ $b'$ represent the trolley-pole; $b^2$, the pull-cord for the same; $b^3$, the base-plate, and $b^4$ the king-bolt or swivel-pin, by which the plate $b^3$ and the trolley are secured to the fixed base, (not shown,) with freedom for the ordinary horizontal pivotal motion. The pole-socket $b'$ is pivoted to lugs $b^5$, rising from the plate $b^3$, by pin or bolt $b^6$ in the usual way, but is shown as differing from the ordinary socket in having a slot $b^7$ with an inclined upper wall or cam-surface, as shown at $b^8$, so as to make the slot of greater length vertically at the front than at the back of the pole.

On the pin $b^6$ within the slot $b^7$ I mount a lever $c$, which is of a length to extend beyond the pole in both directions and is operative by the pole as a setting device and a tripping device for the tension device. In other words, the lever $c$ is free for pivotal motion under the movement of the trolley-pole with the effects which will presently more clearly appear.

The upper end of the spring $c'$ is shown as secured to the ordinary anchor-lug $b^9$, fixed to the back of the pole-socket $b'$. The lower end of the spring $c'$, however, is secured to the rear arm of a bell-crank anchor $c^2$, which has its elbow pivoted, as shown at $c^3$, to a lug or lugs $b^{10}$, rising from the rear of the base-plate $b^3$. The forward arm of the bell-crank spring-anchor $c^2$ is in the same vertical plane with the rear end of the lever $c$ and is provided with a suitable notch $c^4$ or other equivalent device for engagement with the rear end of the lever $c$, as shown in Figs. 1 and 4, for locking the tension device under proper working tension. The rear end of the lever $c$ also works against the forward face of the bell-crank spring-anchor with a camming action under a downward movement of the pole, as shown in Fig. 4, to rock the bell-crank spring-anchor rearward and set the tension device under working tension.

The action of the parts above noted is probably clear from the drawings, Figs. 1 to 4, and the statements already made. When the parts are in the position shown in Fig. 1, the lever $c$ will hold the bell-crank anchor $c^2$ in its rearmost position and thereby hold the spring $c'$ and the trolley-pole under proper working tension. When the trolley jumps from the wire, the pole will spring upward into the position shown in Fig. 2, and thereby the back of the pole-socket will rock the rear end of the lever $c$ downward and trip the same out of engagement with the bell-crank anchor. This permits the bell-crank anchor $c^2$ to rock forward and give slack to the spring $c'$. Hence by gravity the pole will fall into the position shown in Fig. 3 to a point below the level of the line-wire, so as to be safe from any interference on account of overhead obstructions. By then pulling down the pole into the position shown in Fig. 4 the front surface of the pole-socket at the inclined surface $b^8$ of the slot $b^7$ will rock the front end of the lever $c$ downward, and thereby the rear end of the said lever $c$ will rock the bell-crank spring-anchor $c^2$ backward until the rear end of the lever $c$ engages with the notch $c^4$ or equivalent device of the bell-crank, as shown in Fig. 4. The tension device will thereby be reset and held under the proper working tension, as shown in Figs. 1 and 4.

Referring to Fig. 11, the combined tripping and setting lever $f$, instead of being in the form of a flat piece, like the lever $c$, to work through a slot $b^7$ in the pole-socket $b'$, is of skeleton or box-like form, so as to embrace the heel of the socket, and is provided with upwardly-projecting rear and front arms $f'$ to afford striking surfaces for coöperation with the pole-socket to rock the said lever. It would be pivoted on the pin $b^6$ outside the pole-socket. Otherwise the action would be exactly the same as with the lever $c$. (Shown in Figs. 1 to 4.) The form of said tripping and setting lever $c$ shown in Figs. 1 to 4 would be a little cheaper to make and apply on new trolleys; but the form of lever $f f'$ shown in Fig. 11 could be more cheaply adapted or applied to trolleys already in use.

Referring now to the modified construction shown in Figs. 5 to 7, inclusive, the lower end of the spring $c'$ is anchored to a link $g$, pivoted to the rear lug or lugs $b^{10}$ of the base-plate $b^3$, or it may be in the form of a crank-arm on a rock-shaft thus pivoted. The upper end of the link $g$ is connected to the rear end of a toggle-lever $g'$, the forward end of which is pivoted to a suitable lug or lugs $g^2$, rising from the front end of the base-plate $b^3$. When the knuckle-joint $g^3$ of the toggle-lever $g'$ is below the end pivots of the toggle-arms, the said toggle-lever will of course lock the link or crank-arm $g$ in its rearmost position, provided the knuckle cannot continue its downward movement. The knuckle is prevented from continuing its downward movement by striking the face of the base-plate $b^3$ or by the construction of the knuckle. Hence the toggle can be made to hold the tension device under proper working tension, as shown in Fig. 5. The pole-socket $b'$ has on its lower end a forwardly-projecting cam-foot $g^4$, which is adapted to engage under a lateral projection on the toggle-lever, or is itself of such form as to engage under the toggle-lever at some point intermediate the end pivots thereof for raising the knuckle $g^3$ above the straight line through the end pivots under the upward movement of the pole after the jump from the wire. The forward surface of the pole-socket engages with the same or some other projection, to throw the toggle down below the center, for resetting the parts, as shown in dotted lines in Fig. 7. I prefer to use two toggles $g'$ on opposite sides of the trolley, which are connected by the common pivot-pin $g^3$ at the knuckle, which permits the said knuckle-pin $g^3$ to serve as the lateral projection, both for engagement with the cam-foot $g^4$ of the pole on its upward movement after the jump and to engage with the forward face of the pole-socket when pulled down into its lowermost position, as shown in Fig. 7. The action is obvious from the statements already made. When the parts are in working position, they will appear as in Fig. 5. After the trip they will appear as in Fig. 6. After the trip and the fall of the pole by gravity they will appear as in full lines in Fig. 7, and when the pole is pulled down to reset the tension device under working tension they will appear as in dotted lines in said Fig. 7.

In the form shown in Figs. 8 to 10, inclusive, toggles are employed with the same general effect and operated by the pole in the same manner as in Figs. 5 to 7; but the slack motion and setting motion for the spring is secured by permitting the rear end pivots $h$ of the toggles to slide in their bearings longitudinally of the base. These bearings are afforded by vertical side flanges $h'$, rising from the base $b^3$ and provided with slots $h^2$, extending longitudinally thereof at a slight upward incline. The cross-rod $h$, forming the rear end pivots for the toggle-arms $g'$, are mounted in the said slots $h^2$ and are located forward of the rear ends of the said toggle-arms.

When the parts are in the position shown in Fig. 8, the tension device will be held under proper working tension. After the jump and the trip the parts will appear as in Fig. 9, and by pulling the pole down into the position shown in Fig. 10 the tension device will be reset under proper working tension.

The word "tension" has been herein used in a sense sufficiently broad to cover any yielding push or pull which will cause the trolley-pole to hug the line-wire with a yielding action, and the words "tension device" have been used in a sense equally broad to cover any form of device for producing the said tension on the pole, whether the same be done by a spring, by liquid, or by a confined body of elastic fluid under pressure, or in any other way, such as by a rubber cushion.

Analysis will show that all of the several forms illustrated, and every other form which the invention could take, involve a controller for the tension device which is operated by the pole under its upward movement, after the jump, to release the pole from tension and permit the same to drop into a safe position, and which is operative by the pole when drawn down to some predetermined point to reset the tension device and pole under the proper working tension.

What I claim, and desire to secure by Letters Patent of the United States, is as follows:

1. The combination with a trolley-pole, of a tension device therefor having a base or anchor part which is movable with respect to the trolley-pole, and a combined trip and setting device for said movable base or anchor part, comprising a pair of levers that are locked, to set said tension device under strain, by engagement with each other at a point to one side of the dead-center of said levers and are tripped by the direct contact therewith of parts that are rigid with the trolley-pole, substantially as described.

2. The combination with the trolley-pole, and a spring or springs for setting the same under tension, of the bell-crank anchor $c^3$, for the lower end of the spring, having the notch $c^4$, and a lever pivoted to the trolley-pole pivot-pin, and operative by the pole to rock said bell-crank anchor and set and hold the same in its tension-producing position, when the pole is pulled down and operative by the pole, when it jumps from the wire, to release the bell-crank anchor and permit the same to rock into its slack-producing position, for allowing the pole to drop into a safe position, substantially as described.

In testimony whereof I affix my signature in presence of two witnesses.

BÖRRE H. BÖRRESON.

Witnesses:
JAS. F. WILLIAMSON,
E. F. ELMORE.